March 16, 1965 R. M. G. BOUCHER 3,173,612
METHOD OF PRODUCING AEROSOLS, SPRAYS AND
DISPERSIONS AND DEVICE THEREFOR
Filed Feb. 12, 1963 5 Sheets-Sheet 1

INVENTOR.
RAYMOND MARCEL GUT BOUCHER
BY
*Cyrus D. Samuelson*
ATTORNEY

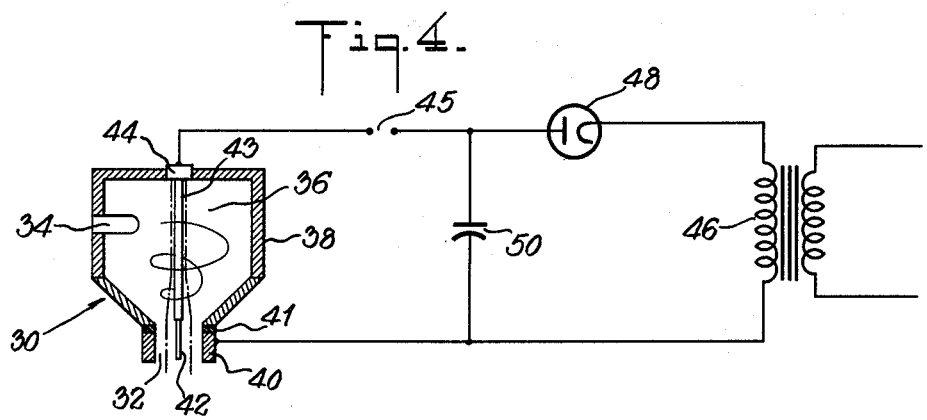
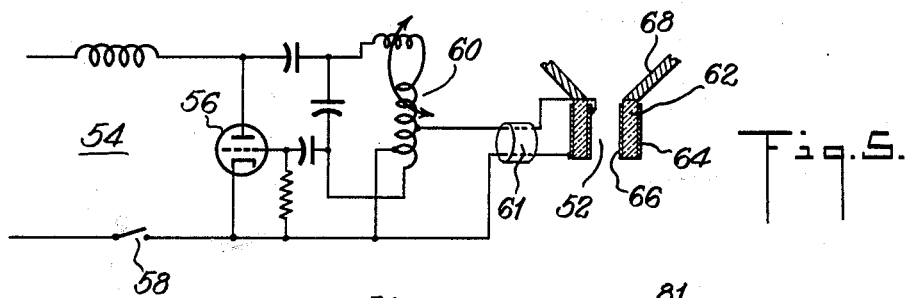
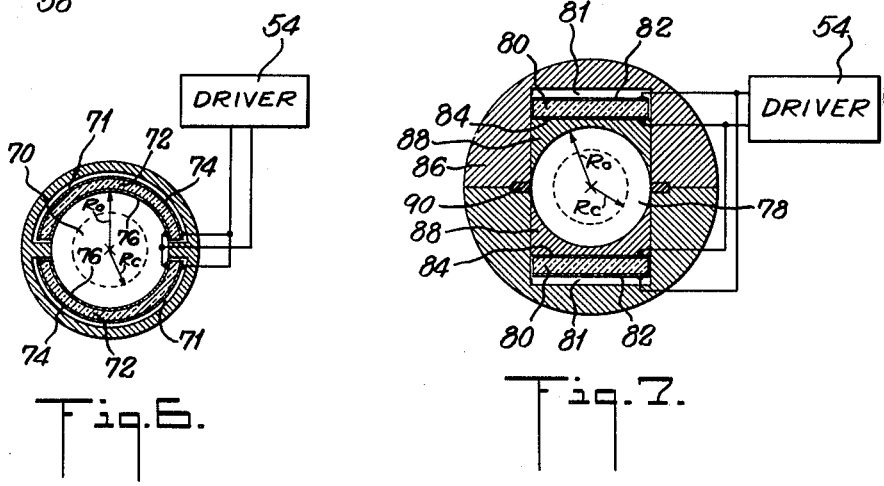

March 16, 1965  R. M. G. BOUCHER  3,173,612
METHOD OF PRODUCING AEROSOLS, SPRAYS AND
DISPERSIONS AND DEVICE THEREFOR
Filed Feb. 12, 1963  5 Sheets-Sheet 3

INVENTOR.
RAYMOND MARCEL GUT BOUCHER
BY
*Cyrus D. Samuelson*
ATTORNEY

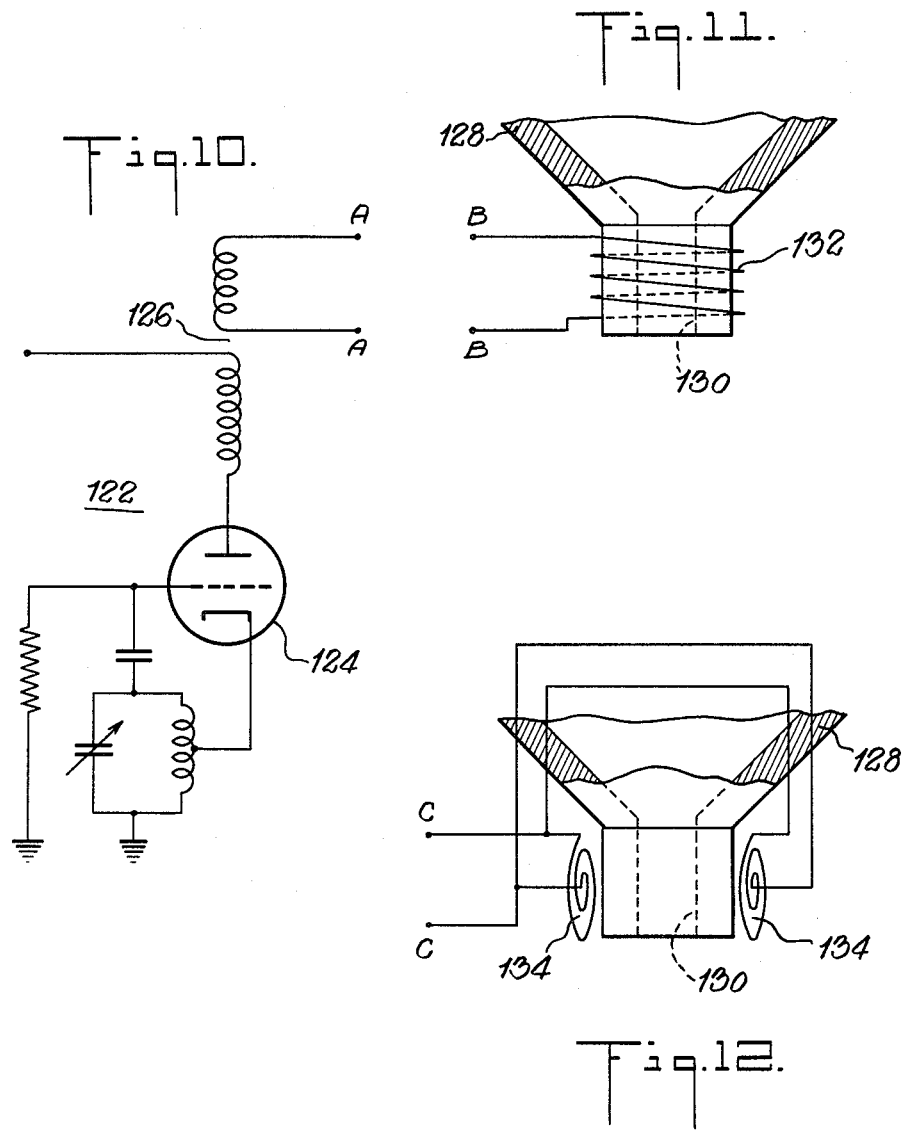

United States Patent Office 3,173,612
Patented Mar. 16, 1965

3,173,612
METHOD OF PRODUCING AEROSOLS, SPRAYS AND DISPERSIONS AND DEVICE THEREFOR
Raymond Marcel Gut Boucher, Metuchen, N.J., assignor to Macrosonics Corporation, Carteret, N.J., a corporation of New Jersey
Filed Feb. 12, 1963, Ser. No. 257,891
26 Claims. (Cl. 239—4)

The invention relates to a method of producing aerosols, sprays and fine liquid and/or particle suspensions of a controlled and variable size at variable flow rates and to a device therefor. In particular, the invention is directed toward providing a method and device for carrying out the method wherein the spray or aerosol characteristics are maintained constant and independent of the applied pressure.

It is an important object of the invention to provide a method of producing aerosols, sprays, and fine liquid or solid dispersions wherein the output characteristics are independent of the applied pressure.

It is a further object of the invention to provide such a method wherein an artificially superimposed turbulence produces particle dispersions of predetermined and variable size distributions.

It is a still further object of the invention to provide means for controlling and modifying the Reynolds numbers for both the axial and tangential velocity components of the fluid being emitted from a swirl nozzle by applying a secondary force field to the fluid at the outlet in the exit orifice of the nozzle.

It is a still further object of the invention to provide means for applying an external acoustic force field to the fluid.

It is a still further object of the invention to provide means for applying an external electrical force field to the fluid.

It is a still further object of the invention to provide means for applying an external electromagnetic force field to the fluid.

It is a still further object of the invention to provide means for applying an external magnetic force field to the fluid.

It is a still further object of the invention to provide means for applying an external thermal force field to the fluid.

These and other objects, features, advantages and uses will be apparent during the course of the following description, when taken in conjunction with the accompanying drawings, wherein:

FIGURE 1 is an elevational view in section of a typical swirl nozzle of the prior art;

FIGURE 1A is a sectional view of the swirl nozzle of FIGURE 1, taken along the lines 1A—1A of FIGURE 1, viewed in the direction of the arrows;

FIGURES 2 and 3 are diagrams depicting the underlying theory of operation of swirl nozzles;

FIGURE 4 is a view showing the driving circuit for impressing an external electrical force field on the fluid being emitted from a swirl nozzle modified in accordance with the teachings of the invention;

FIGURE 5 is a view showing the driving circuit used for exciting a hollow cylindrical, piezoelectric transducer placed at the exit orifice of the swirl nozzle and driven in thickness or radial modes;

FIGURE 6 illustrates a modification of the exit orifice of the swirl nozzle of FIGURE 5 wherein the transducer is comprised of a plurality of cylindrical sections driven in thickness or radial modes;

FIGURE 7 is a view, similar to that of FIGURE 6, showing the employment of a plurality of transducers driven in thickness or longitudinal modes;

FIGURE 8 is an elevational view, in section, of a swirl nozzle of the invention showing the use of a focusing transducer to superimpose the external force field on the fluid being emitted from the exit orifice of the nozzle;

FIGURE 9 is a sectional view of an exit orifice of a swirl nozzle of the invention, showing the use of a hollow cylindrical transducer driven in thickness or radial modes to impose the external acoustic force field on the fluid emitted from the exit orifice and having a cooling chamber adapted to keep the temperature of the transducer at proper operational value;

FIGURE 10 is a schematic diagram of the electronic circuit used to supply control signals to electromagnetic coils mounted in the vicinity of the exit orifice of a swirl nozzle of the invention;

FIGURE 11 is a view of the exit orifice of a swirl nozzle of the invention diagrammatically showing the use of the heating (thermal) effect from an electromagnetic coil to carry out the teachings of the invention;

FIGURE 12 is a view of the exit orifice of a swirl nozzle of the invention diagrammatically showing the use of a varying magnetic field produced by two electromagnetic coils to carry out the teachings of the invention.

Figure 13:
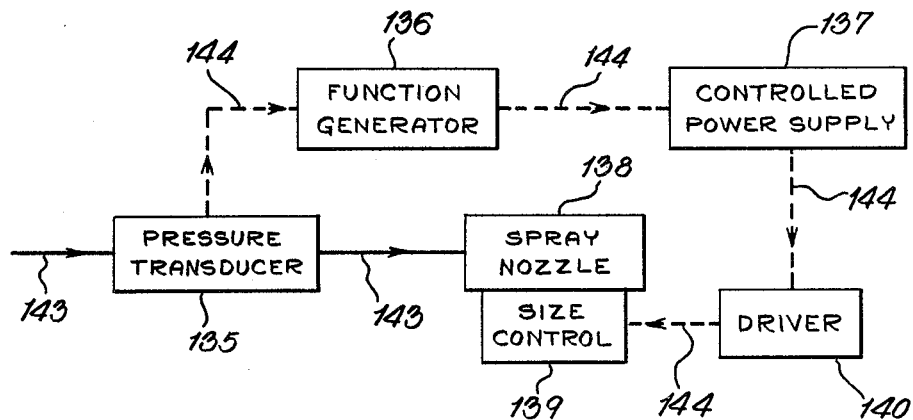
FIGURES 13 and 14 are block diagrams of servo systems adapted to control the output of swirl nozzles of the invention.

In the drawings, wherein, for the purpose of illustration, are shown several embodiments of devices for carrying out the method of my invention, the numeral 20 designates a prior art swirl nozzle (FIGURES 1 and 1A).

A study of the operation of swirl nozzle 20 will aid in the understanding of the improvements of the present invention. Swirl nozzle 20 is seen to comprise body 22, plenum chamber 24, inlet orifice 26 and exit orifice 28. Atomization of the fluid injected into the chamber 24 is accomplished by the swirling or spinning motion imparted to the fluid prior to its issuance from the exit orifice 28. This vortical or spinning motion of the fluid results from the injection of the fluid under pressure into spin chamber 24 through inlet orifice 26. There may be more than one inlet orifice used to inject the fluid into the chamber. The plane of the axis of the inlet orifice may be set at any angle to the major axis of the nozzle. For example, in FIGURE 1A the inlet orifice 26 is orthogonal to the main flow axis of the nozzle and is tangent to the circumference of the main plenum chamber 24. Swirling motion of the fluid within the chamber may also be attained by using grooved core inserts in the inlet orifice or orifices so as to cause the fluid to enter the chamber at any desired angle through a plurality of passages.

The spray pattern emitted from these swirl pressure nozzles is generally in the shape of a hollow cone. By varying the shape of the exit orifice it is possible to form spray patterns of virtually any desired shape. The jets issuing from the exit orifice of these swirl type nozzles are usually characterized by an air core or cavity at the axis of the jet as the fluid is emitted from the exit orifice. High speed photographs taken of exit orifices formed of transparent plastic material show the formation of the air core clearly. The pressure at which the air core forms is a function of the viscosity of the fluid. As the viscosity increases, the pressure at which the air core forms also increases. J. D. McIrvine has pointed out that a viscous liquid (90 centipoises) must be under a pressure of about 700 p.s.i. to obtain the same degree of atomization as water (1 centipoise) at a pressure of a few tens p.s.i. (M.S. thesis, University of Wisconsin, 1953). In the case of water, for example, the air core forms at the relatively low pressure of less than 1 p.s.i. (pound per square inch).

Prior to the formation of the air core, the fluid issues from the exit orifice like a corkscrew with insufficient swirl velocity to form an air core. As the pressure is increased, the helical pattern of the jet becomes more pronounced and jet breakup due to ligament formation resulting from unstable films becomes predominant. At a pressure of between approximately 142 and 143 p.s.i., the air core starts to form in, for example, soy bean oil (90 centipoises viscosity). The fluid attempts to blossom into a spray only to be drawn back again by surface tension. Further increases in pressure result in the characteristic shape of the fully developed hollow conical spray shape.

Prior art devices which are used to supply a fuel spray of constant characteristics for rocket and jet engines despite wide variations in fuel flow rate are much more complicated than the swirl nozzle of FIGURES 1 and 1A. A quite common device for this type of operation is the "return type" flow nozzle in which the fuel enters a spin chamber through ports set at an angle to the chamber periphery and in which two outlets from the spin chamber are provided. The smaller of the two outlets ejects the fluid fuel as a spray into the engine and the larger of the two outlets returns the excess fuel injected into the chamber to the reservoir. This type of fuel atomization mechanism is very complicated mechanically and there is a need for a simpler mechanism to accomplish the desired results. The method and device of the present invention offers a simple and inexpensive solution to this problem because the user may maintain constant output spray characteristics, adjustable at will, at any flow rate in a classical swirl nozzle modified in accordance with the teachings of the invention.

In order to understand the theory underlying the invention, the hydrodynamics of fluid flow in swirl nozzles should be reviewed. First, let us consider the case of a fluid flowing in two concentric streamlines separated by a distance $dr$ (FIGURE 2). The point tangential velocity is $v_t$. If a differential element of fluid is considered and its curved surface area is $dA$ and the radius of curvature is $r$, then the mass of the element is $\rho dr dA$ where $\rho$ is the specific gravity of the fluid. The radial acceleration due to rotation of the fluid is $v_t^2/r$ and we get:

$$dp = \rho dr \left(\frac{v_t^2}{gr}\right)$$

where $g$ = acceleration of gravity.

This means that the pressure variation in a fluid having curved flow decreases as the logarithm of the radius $r$ for $v_t$ independent of $r$. Therefore, the exact variation of pressure with radius will depend upon the relationship between the tangential velocity and the radius.

The fluid flow condition in a swirl type pressure nozzle corresponds to what is known as a "free vortex." In order to obtain satisfactory atomization from a swirl nozzle the free vortex conditions must prevail. The velocity distribution in a free vortex can be derived from the expression for the torque which produces a change in the angular moment of momentum.

Thus:

$$\text{Torque} = F_r = \frac{d(mv_t r)}{g dt}$$

where $m$ = the mass of the fluid and $F$ = the force applied.

For a free vortex, the torque is zero and hence:

$$\frac{d(mv_t r)}{dt} = 0$$

For constant mass $$v_t = \frac{\Omega}{r}$$

where $\Omega$ is a constant, sometimes called the circulation constant. Substituting for $v_t$ in the expression for $dp$ and integrating between $r_1$ and $r_2$ we get:

$$p_{r_1} - p_{r_2} = \left(\frac{\rho \Omega^2}{2g}\right)\left(\frac{1}{r_2^2} - \frac{1}{r_1^2}\right)$$

In other words, one can see that an air core will form in swirl nozzles since the last two equations show that an infinite velocity is required when $r=0$. Since it is impossible to obtain an infinite velocity, the spinning fluid in a swirl nozzle cavitates and creates an air core at the exit orifice. Consequently, the fluid forms an annular ring as it passes through the exit orifice (FIGURE 3) and the average axial velocity of the fluid annulus flowing in the exit orifice is given by:

$$(V_{ax})_{avg} = \frac{Q}{\pi(R_o^2 - R_c^2)}$$

where:

$(V_{ax})_{avg}$ = average axial velocity of the fluid annulus flowing in the exit orifice
$Q$ = volumetric flow rate
$R_c$ = radius of the air core
$R_o$ = radius of the exit orifice The radius of the air core $R_c$ can be computed theoretically if certain assumptions, such as frictionless flow, are made. From the works of G. I. Taylor (Seventh Proc. Int. Cong. App. Mech., 2, 280—1948), M. Doumas and R. Laster (Chem. Eng. Progr. 49, 518—1953), E. Giffen and A. Muraszew (The Atomization of Liquid Fuels, John Wiley & Sons, 1953) one can calculate $R_c$ for various nozzle and different flow conditions.

Experimental measurements made with water by W. H. Darnell (Ph.D. Thesis, University of Wisconsin, 1953) using transparent plastic nozzle bodies showed that $R_c/R_o$ was essentially independent of pressure, and hence capacity, for a given combination of exit orifice and grooved-core inlet, over a pressure range of 100 to 1600 p.s.i. Since the air core diameter is independent of pressure, the thickness of the annular film of fluid in the exit orifice remains constant as the pressure varies. This precludes the possibility of correlating the drop size with the thickness of the annular ring. The method of the invention teaches the modification and control of the annular ring of fluid inside the nozzle in such a manner that an artificially superimposed, controlled turbulence will produce particle dispersions of known and variable size distributions. This is accomplished by controlling and modifying the Reynolds numbers for both the axial and tangential velocity components by superimposing an external force field on the fluid. This superimposed, external force field affects the critical dimensions of the fluid annular ring within the exit orifice. This external force field may be acoustic, electrical, electromagnetic, magnetic or thermal depending upon the nature of the fluid being dispersed through the exit orifice. For example, if a liquid metal or alloy such as has been described by R. H. Wetzel (Ph.D. Thesis, University of wisconsin, 1952) is to be sprayed under relatively high pressure and temperature, it is advisable to use a radio frequency or magnetic external force field of the proper characteristics. The dimension $R_s$ on FIGURE 3 designates the radius of the plenum chamber.

In FIGURE 4 there is illustrated a swirl nozzle modified in accordance with the teachings of the invention in which the external force field used to modify the fluid particle size and dispersion is electrical. Nozzle 30 is seen to comprise plenum chamber 36, exit orifice 32, inlet 34 through which the fluid is introduced into plenum chamber 36 under pressure, and housing 38. Exit orifice 32 is formed inside the necked, hollow metallic cylinder 40 which is the first electrode and which is electrically insulated from housing 38 by insulation 41. The second electrode 42, which is smaller in radius than $R_c$, is supported on stem 43 which is insulated from housing 38 by means of bushing 44.

Power from transformer 46 is rectified by rectifier 48 and applied across electrodes 40 and 42 as shown in FIGURE 4. The capacitor 50 becomes charged and when discharged through control 45 causes current, in the form of one or more arcs, to flow between the electrodes. Control 45 is employed to control the amount of arcing across the main electrodes in the exit orifice 32. Control 45 may be of the "2-ball," or the so-called "pawnshop" or "3-ball" type. It may also be a vacuum or gas tube, a relay or any other control device. The current flow across the exit orifice imposes an external electrical force field on the fluid as it is ejected from exit orifice 32 and thereby controls the particle size and dispersion of the emitted spray.

In FIGURE 5 there is illustrated a further device for carrying out the teachings of the method of the invention. Exit orifice 52 of a swirl nozzle is formed within necked, hollow cylindrical, electromechanical transducer 62 which is mounted on housing 68. Transducer 62 is formed of piezoelectric material and is provided with electrodes 64 and 66 so that it may be excited in the radial or the thickness modes. Transducer 62 may be formed of quartz crystal (for example 0°X cut), Rochelle salt (45° X cut), amonium dihydrogen phosphate (ADP 45° Z cut), barium titanate with or without additives, lead zirconate titanate with or without additives such as small amounts of lanthana, neodymia, niobia or tantala. Other materials such as the ferromagneic metals and alloys such as permendur, permalloys or Hensler alloys, sintered ferrites with ceramic bonding and other similar materials may also be used to form the transducer. The transducer illustrated is of the barium titanate type with a small amount of lead titanate added and is suitably mounted on the swirl nozzle housing so that its motion will not be unduly interfered with (details not shown). The motion of the transducer will create turbulent conditions inside the annular film of fluid and thus control the particle size and the dispersion of the particles.

Driver 54 is a classical Hartley oscillator and is seen to comprise triode vacuum tube 56, switch 58 and variometer 60. Power for the cathode and the plate of tube 56 is delivered from a controlled power supply using either a variable auto-transformer or grid controlled rectifiers (not shown). Frequency variations of the order of ±5% are obtained by means of the variometer 60 in which the moving coil is rotatable through 180°. Switch 58 is provided to start and interrupt the oscillations. The output of driver 54 is applied to electrodes 64 and 66 through coaxial cable 61. Other means and arrangements for generating ultrasonic oscillations of the desired frequency and energy may be used in place of the one illustrated in FIGURE 5. For example, the ultrasonic field superimposed at the exit orifice may be produced by magnetostrictive or electromagnetic transducers of the appropriate shape and characteristics. In such cases, suitable drivers, different from that illustrated but well-known in the art would be utilized.

In FIGURE 6 there is illustrated a further embodiment of the invention showing the employment of a plurality of electromechanical barium titanate transducers which are sections of a hollow cylinder. While two transducers are illustrated in the figure, more than two transducers may be used with equal facility and efficiency. The transducers 72 are provided with electrodes 74 and 76 and the transducers are mounted to the housing so as to surround the exit orifice 70. Spaces 71 are provided behind transducers 72 and filled with air or any aerated material (such as organic foam, rubber, cork, etc.) with a low acoustic impedance. The transducers are driven in their radial or their thickness modes by driver 54.

The fluid within exit orifice 78 of FIGURE 7 is agitated by the action of transducers 80 which are formed of slabs of barium titanate or similar material and are driven in thickness mode by driver 54. Electrodes 82 and 84 are utilized to provide the necessary electrical connections to the transducers. Transducers 80 are mounted in holder 86 which is formed of two parts separated by elastic joint 90. If this joint were not used, the holder would serve to damp the vibrations of the transducers and reduce the amplitude of the vibrations applied to the fluid. Spaces 81 are provided behind transducers 80 and filled with air or any aerated material (such as organic foam, rubber, cork, etc.) with a low acoustic impedance. Transmission of the excitation from the transducers to the fluid is through metallic elements 88. It is also possible to mount a plurality of transducers surrounding the exit orifice and to excite the transducers in longitudinal mode.

Swirl nozzle 92 of FIGURE 8 is seen to comprise housing 94, plenum chamber 96, inlet 98 and exit orifice 100. Focusing transducer 102 of barium lead titanate is provided with electrodes 104 and 106, is separated from housing 94 by space 101, and is driven from driver 54. Focusing transducer 102 emits a strong, narrow beam of acoustic energy inside the air core so that the flow conditions at the interface of the air core and the fluid annulus is perturbed by the effects of either acoustic or radiation pressure or a combination of both.

It should be understood that the transducers of FIGURES 6 through 8 may be formed of the various alternative materials set forth as useful for the transducer of FIGURE 5. It should be noted that there is no practical frequency limitation for carrying out the method of the invention since turbulent fluid film conditions have been observed over the range from about 100 cycles per second to about 100 megacycles per second. The wave emission may be continuous or pulsed so long as sufficient energy to excite the fluid annulus is provided.

It is well-known that the magnetostrictive and electrostrictive effects in many materials are considerably reduced at temperatures known as the critical temperatures or Curie points. The value of the Curie points vary with the particular material of which the transducer is formed. As a result it is not possible to use many transducers in environments in which the ambient temperature is higher than the Curie point of the material. In order to extend the operating range of devices of the invention, a classical cooling system is provided to maintain the temperature of the transducer at a point below the Curie point of the material.

Necked, hollow cylindrical transducer 110 of lead titanate zirconate surrounds exit orifice 108 and is provided with electrodes 112 and 114 connected so as to be driven from driver 54. Cooling chamber 116 having inlet 118 and outlet 120 is utilized to maintain the temperature below the Curie point of transducer. The cooling system may employ gases or liquids in a continuous or discontinuous manner at variable temperatures or pressures. Transducer 110 is separated from the cooling chamber 116 by air space 111 and is suitably mounted on the housing so as to be free of excessive damping from the housing (mounting details not shown).

The magnitude of the effect (controlled particle dispersion) is a direct function of the acoustic power radiated inside the exit orifice. I have found that the acoustic energy applied to the fluid annulus should be within the range 0.1 watt to 1 kilowatt for fluid flow rates within the range of 1 to 10 gallons per minute. Large capacity high pressure nozzles will require larger or smaller values depending upon the acoustic impedance and other physical characteristics of the fluid.

In FIGURE 10 there is illustrated classical induction heating supply 122 which can be used to supply excitation to the systems of FIGURES 11 and 12. Positive voltage is applied to the plate of vacuum tube 124 in the conventional manner through the primary of transformer 126. Tuning is accomplished by means of the variable capacitor in the tuned circuit between the control grid and ground. The output of supply 122 appears across terminals A—A of the secondary of transformer 126. The output of supply 122 may be suitably interrupted by keying its power supply or the plate, grid or cathode circuits of vacuum tube 124 in any of a number of ways which are well-known in the art (keying details not shown).

The system of FIGURE 11 is excited by supply 122 of FIGURE 10 by connecting points A—A to points B—B. Coil 132 is wound around the portion of housing 128 which surrounds exit orifice 130. The magnetic field resulting from the current flow in coil 132 is in the same direction as the flow of the spray out of the nozzle. The characteristics of the spray are modified by the external force field developed by coil 132. This external force field is both magnetic and thermal. The greater effect on the spray is accomplished by the heat generated in coil 132.

The system of FIGURE 12 is excited by connecting points C—C to points A—A of FIGURE 10. Coils 134 are shown diagrammatically in FIGURE 12. When current flows in the coils, a magnetic field perpendicular to the spray direction is built up across exit orifice 130. The magnetic field is varied by varying the output of supply 122 or by varying the excitation supplied to a bucking coil (details not shown). The system of FIGURE 12 has been found to be very useful in controlling the characteristics of molten metal spray. The external magnetic force field produced by the coils of FIGURE 13 may also be produced by using one or more permanent magnets. The strength of the field may be varied by changing the positions of the magnets with respect to the orifice. These variations may be either in distance or direction.

It is within the contemplation of the invention to provide means for monitoring the flow conditions at the exit orifice and the nozzle inlet and the intensity of the superimposed external force field. A servo mechanism may be provided to cooperate with the monitors so that the parameters may be adjusted as function of the others. Thus, it will be possible, for example, to automatically maintain a favorable ratio between $E_V$ (average radiated energy) and $Q_1$ (mass flow rate) for a particular fluid and nozzle design. Such a system will be extremely useful when there are sudden in-line pressure increases (such as in jet engines) which require more powerful emission to maintain the finer degree of atomization required.

Since the state of turbulence inside the fluid annulus can be adjusted selectively for a known mass flow rate Q, it is possible to control the shape of the size distribution curve as well as the mean diameter (average, geometric, median, harmonic, etc.) of the dispersion. Consequently, the method of the present invention and the devices for carrying out the method will allow complete control of the state of dispersion of any fluid (namely, uniformity and particle distribution) without the necessity of modifying the flow conditions into the nozzle (namely, pressure and volumetric flow).

Following are some of the important applications for which the method and device of the invention may be employed: thrust control in liquid fuel rockets and jet engines; the production of mono and poly disperse aerosols for chemical warfare or therapeutic purposes; the atomization of space engine fuel; the washing of parts (dishes, tools, etc.); washing and dissolution of chemical gases; the production of uniform beads or powders in the food and drug industries (homogenized milk, vitamins, dehydrated juices, etc.); the production of metal, glass or ceramic micro-spheres; the production of insecticide clouds tailored to the type of treatment required (deposit on leaves, grass, trees, etc.); the production of fine solid particle dispersions by controlled spraying of a suspension of these particles in a liquid with a low vapor pressure; spray drying; spray painting or coating; chemical reactions in the gas phase; burner combustion, pest control; and the destruction of airborne bacteria.

In FIGURE 13 there is shown a diagrammatic illustration of a system for automatically correcting the size distribution of the spray when there is a change in the inlet pressure. The electrical lines 144 are shown dashed and the fluid lines 143 are shown solid. Inlet to the pressure transducer 135 is from the left of the figure. The fluid pressure on transducer 135 is the same as that applied to spray nozzle 138. Transducer 135 develops an output signal proportional to the inlet pressure. This signal is fed to function generator 136 which furnishes the correct amount of control signal to controlled power supply 137. Controlled power supply 137 furnishes the proper triggering signal to driver 140 which excites size control 139. Size control 139 may operate in a number of ways: for example, it may be used to change the excitation frequency of the transducer mounted at the exit orifice; it may change the power applied to the transducer; or it may control or alter the pressure at the inlet to the spray nozzle. Other techniques and structure, which serve to control any of the parameters influencing the spray characteristics, may be employed in size control 139.

Figure 14:
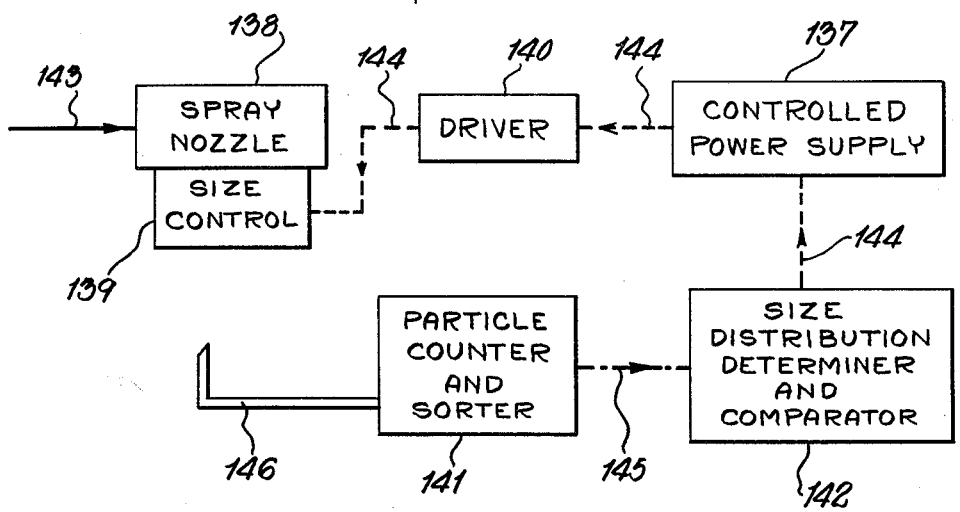

If it is possible to sample the spray emitted from the spray nozzle 138, a closed loop servo system may be employed to automatically regulate the size distribution. Such a system is illustrated in the diagram of FIGURE 14. The inlet to spray nozzle 138 is from the left of the figure through fluid line 143. A sample of the spray emitted from nozzle 138 is collected in tube 146 and is fed to particle counter and sorter 141. Counter and sorter 141 counts the number of particles of each size group and develops an electrical signal for each size group which is a function of the number of particles of that size in the group.

These electrical signals are fed through line 145 to size distribution determiner and comparator 142. Determiner and comparator 142 is essentially a computer which has been programmed to produce error signals when the spray characteristics fall outside certain predetermined limits. The output of determiner and comparator 142 is applied to controlled power supply 137 through electrical line 144. The output of power supply 137 is fed to driver 140 and thence to size control 139 which controls the spray characteristics in the same manner as has been described above in connection with the embodiment of FIGURE 13.

While the invention has been disclosed in relation to specific examples and embodiments, I do not wish to be limited thereto, for obvious modifications, changes, alterations and adjustments will occur to those skilled in the art without departing from the spirit and scope of the invention.

Having thus described my invention, I claim:

1. The method of controlling the size and distribution of fine fluids or particle suspensions produced in a swirl nozzle having a plenum chamber and an exit orifice by the expansion of the annular fluid ring flowing within the exit orifice which comprises forming an annular ring of fluid at the exit orifice of the swirl nozzle by the creation of a free vortex flow condition by injecting the fluid under pressure into the plenum chamber of the swirl nozzle and the subsequent flow of the fluid through the exit orifice; and applying a selected external force field which acts to modify the internal turbulence of the film of fluid forming the annular ring and flowing adjacent the inner wall of the exit orifice.

2. The method of claim 1 wherein the selected external force field is electrical.

3. The method of claim 1 wherein the selected external force field is acoustic.

4. The method of claim 1 wherein the selected external force field is electromagnetic.

5. The method of claim 1 wherein the selected external force field is thermal.

6. The method of claim 1 wherein the selected external force field is magnetic.

7. A device for controlling the size and distribution of fine fluid or solid particles dispersed in a fluid comprising: a housing having a plenum chamber formed therein;

an inlet inserted in the housing for introducing fluid under pressure into the plenum chamber so as to cause the fluid to swirl therein;
a necked, hollow element affixed to the housing, forming an exit orifice therein, which communicates with the plenum chamber, within which a free vortex condition is created so that the fluid is emitted from the exit orifice as an annular ring; and
means for applying a selected external force field to the fluid at the exit orifice before the fluid is emitted therefrom so as to modify the internal turbulence of the film of fluid forming the annular ring and flowing adjacent the inner wall of the exit orifice.

8. A device for controlling the size and distribution of fine fluid or solid particles dispersed in a fluid comprising:
a housing having a plenum chamber formed therein;
an inlet inserted in the housing for introducing fluid under pressure into the plenum chamber so as to cause the fluid to swirl therein;
an electrically conducting, necked, hollow element affixed to the housing and insulated therefrom which forms an exit orifice in the housing communicating with the plenum chamber, within which a free vortex condition is created so that the fluid is emitted from the exit orifice as an annular ring;
a central electrode mounted within said exit orifice and spaced therefrom; and
means for causing an arcing current to flow between the central electrode and the necked, hollow element so that the internal turbulence of the film of fluid forming the annular ring and flowing adjacent the inner wall of the exit orifice is modified by the external electric force field generated by the arcing current.

9. A device for controlling the size and distribution of fine fluid or solid particles dispersed in a fluid comprising:
a housing having a plenum chamber formed therein;
an inlet inserted in the housing for introducing fluid under pressure into the plenum chamber so as to cause the fluid to swirl therein;
a necked, hollow element affixed to the housing which forms an exit orifice in the housing communicating with the plenum chamber within which a free vortex condition is created so that the fluid is emitted from the exit orifice as an annular ring;
at least one electromechanical transducer mounted adjacent the exit orifice; and
means for exciting the transduced to create an external, acoustic force field which acts to modify the internal turbulence of the film of fluid forming the annular ring and flowing adjacent the inner wall of the exit orifice.

10. A device as described in claim 9 wherein the electromechanical transducer is the necked, hollow element and has the form of a hollow cylinder.

11. A device for controlling the size and distribution of fine fluid or solid particles dispersed in a fluid comprising:
a housing having a plenum chamber formed therein;
an inlet inserted in the housing for introducing fluid under pressure into the plenum chamber so as to cause the fluid to swirl therein;
a necked, hollow element affixed to the housing which forms an exit orifice in the housing communicating with the plenum chamber within which a free vortex condition is created so that the fluid is emitted from the exit orifice as an annular ring;
a plurality of electromechanical transducers mounted adjacent the exit orifice; and
means for exciting the plurality of transducers to create an external, acoustic force field which acts to modify the internal turbulence of the film of fluid forming the annular ring and flowing adjacent the inner wall of the exit orifice.

12. A device as described in claim 11 wherein each of the plurality of electromechanical transducers is a section of a hollow cylinder.

13. A device as described in claim 11 wherein each of the plurality of electromechanical transducers is a plate.

14. A device for controlling the size and distribution of fine fluid or solid particles dispersed in a fluid comprising:
a housing having a plenum chamber formed therein;
an inlet inserted in the housing for introducing fluid under pressure into the plenum chamber so as to cause the fluid to swirl therein;
an exit orifice formed in the housing and communicating with the plenum chamber within which a free vortex condition is created so that the fluid is emitted from the exit orifice as an annular ring;
a focusing electromechanical transducer mounted in the chamber such that its beam is directed toward the exit orifice; and
means for exciting the transducer to create an external, acoustic force field which acts to modify the internal turbulence of the film of fluid forming the annular ring and flowing adjacent the inner wall of the exit orifice.

15. A device for controlling the size and distribution of fine fluid or solid particles dispersed in a fluid comprising:
a housing having a plenum chamber formed therein;
an inlet inserted in the housing for introducing fluid under pressure into the plenum chamber so as to cause the fluid to swirl therein;
an exit orifice formed in the housing and communicating with the plenum chamber within which a free vortex condition is created so that the fluid is emitted from the exit orifice as an annular ring;
an electromagnetic coil surrounding the exit orifice; and
means for exciting the electromagnetic coil which acts to modify the internal turbulence of the film of fluid forming the annular ring and flowing adjacent the inner wall of the exit orifice to create an external, thermal and magnetic, force field.

16. A device for controlling the size and distribution of fine fluid or solid particles dispersed in a fluid comprising:
a housing having a plenum chamber formed therein;
an inlet inserted in the housing for introducing fluid under pressure into the plenum chamber so as to cause the fluid to swirl therein;
an exit orifice formed in the housing and communicating with the plenum chamber within which a free vortex condition is created so that the fluid is emitted from the exit orifice as an annular ring;
at least one electromagnetic coil mounted adjacent to exit orifice; and
means for exciting the electromagnetic coil to create an external, electromagnetic force field, whose magnetic field vector is perpendicular to the annular fluid stream and which acts to modify the internal turbulence of the film of fluid forming the annular ring and flowing adjacent the inner wall of the exit orifice.

17. A device as described in claim 9 including means for cooling the electromechanical transducer.

18. A device as described in claim 10 including means for cooling the electromechanical transducer.

19. A device as described in claim 11 including means for cooling the plurality of electromechanical transducers.

20. A device as described in claim 7 including means for automatically altering the characteristics of the external force field so that the emitted fluid possesses desired, predetermined characteristics.

21. A device as described in claim 8 including means for automatically altering the characteristics of the external, electric force field so that the emitted fluid possesses desired, predetermined characteristics.

22. A device as described in claim 9 including means for automatically altering the characteristics of the external, acoustic force field so that the emitted fluid possesses desired, predetermined characteristics.

23. A device as described in claim 11 including means for automatically altering the characteristics of the external acoustic force field so that the emitted fluid possesses desired, predetermined characteristics.

24. A device as described in claim 14 including means for automatically altering the characteristics of the external, acoustic force field so that the emitted fluid possesses desired, predetermined characteristics.

25. A device as described in claim 15 including means for automatically altering the characteristics of the external, thermal and magnetic, force field so that the emitted fluid possesses desired, predetermined characteristics.

26. A device as described in claim 16 including means for automatically altering the characteristics of the external, electromagnetic force field so that the emitted fluid possesses desired, predetermined characteristics.

References Cited by the Examiner

UNITED STATES PATENTS

| | | | |
|---|---|---|---|
| 1,939,302 | 12/33 | Heavey. | |
| 2,738,173 | 3/56 | Massa | 239—102 |
| 2,766,064 | 10/56 | Schweitzer | 239—102 |
| 3,039,696 | 6/62 | Point et al. | 239—102 |

FOREIGN PATENTS

| | | |
|---|---|---|
| 907,396 | 3/54 | Germany. |
| 1,041,879 | 10/58 | Germany. |
| 807,080 | 1/59 | Great Britain. |

EVERETT W. KIRBY, *Primary Examiner.*